United States Patent [19]

Muenchow et al.

[11] Patent Number: 4,617,324

[45] Date of Patent: Oct. 14, 1986

[54] ACETYLENIC DI(T-AMYL PEROXIDE) CROSS-LINKING/BLOWING AGENTS FOR POLYETHYLENE

[75] Inventors: John R. Muenchow, Richmond; Lawrence A. Bock, Walnut Creek; Roger N. Lewis, Martinez, all of Calif.

[73] Assignee: U.S. Peroxygen Company, Richmond, Calif.

[21] Appl. No.: 790,285

[22] Filed: Oct. 22, 1985

[51] Int. Cl.$^4$ ................................................ C08J 9/06
[52] U.S. Cl. .................................... 521/96; 521/143; 521/144; 525/333.8
[58] Field of Search ................ 521/96, 143; 525/333.8

[56] References Cited

U.S. PATENT DOCUMENTS

| | | | |
|---|---|---|---|
| 2,670,384 | 2/1954 | Milas | 260/610 |
| 3,214,422 | 10/1965 | Mageli et al. | 525/387 |
| 3,470,119 | 9/1969 | Benning | 260/2.5 |
| 3,640,919 | 2/1972 | Michels et al. | 260/2.5 HA |
| 3,658,730 | 4/1972 | Takahashi et al. | 260/2.5 R |
| 3,818,086 | 6/1974 | Stastney et al. | 264/55 |
| 3,876,613 | 7/1975 | Needham et al. | 260/45.85 S |
| 3,950,278 | 4/1976 | Wada et al. | 260/2.5 HA |
| 3,965,054 | 6/1976 | Nojiri et al. | 521/96 |
| 4,101,464 | 7/1978 | Kamens et al. | 521/88 |
| 4,129,531 | 12/1978 | Rauer et al. | 521/94 |
| 4,166,890 | 9/1979 | Fried et al. | 521/96 |
| 4,276,247 | 6/1981 | Muenchow et al. | 521/96 |
| 4,330,495 | 5/1982 | Halle et al. | 521/96 |
| 4,424,181 | 1/1984 | Senuma et al. | 521/96 |
| 4,499,210 | 2/1985 | Senuma et al. | 521/96 |

OTHER PUBLICATIONS

Heck, "Foaming Agents," *Modern Plastics Encyclopedia* (1979–1980) pp. 184–188.
Flesher, "Polyethylene," *Modern Plastics Encyclopedia* (1979–1980) p. 59.
Kravitz, et al., "Now's the Time to Look . . . ," *Plastics Technology* 10/79, pp. 63–66.
Kirchgessner, et al., "New Family of Peroxide Initiators," *Modern Plastics* 11/84 pp. 66–67.
Abstract 1038-577, *Journal of Cellular Plastics*, Mar.-/Apr. 1979 p. 68.
Chemical Abstracts 90:88490b.
Pastorino, et al., "Crosslinking HDPE with Cyclic Peroxyketals," *Modern Plastics* 9/78 (reprint).

*Primary Examiner*—Morton Foelak
*Attorney, Agent, or Firm*—Townsend & Townsend

[57] ABSTRACT

Novel processes and compositions are provided for the preparation of foamed, cross-linked polyethylene utilizing di(alkylperoxy)acetylene cross-linking/blowing agents. The novel compositions include esters of thiodipropionic acid as activators.

19 Claims, No Drawings

ACETYLENIC DI(T-AMYL PEROXIDE) CROSS-LINKING/BLOWING AGENTS FOR POLYETHYLENE

BACKGROUND OF THE INVENTION

The invention relates to certain acetylenic di(t-amyl peroxides) useful as cross-linking/blowing agents and, in particular, to their use in compositions and processes for the preparation of foamed, cross-linked polyethylene.

It is known to form foamed, cross-linked polyethylene using chemical blowing agents by heating an expandable mixture comprising a thermoplastic resin, such as polyethylene, a cross-linking agent, and a chemical blowing agent. U.S. Pat. No. 3,470,119 teaches a method for manufacturing foamed polyethylene by use of a chemical blowing agent. U.S. Pat. No. 3,658,730 teaches a specific composition for blowing thermal plastic resins. Chemical blowing agents (CBAs) are generally solid compounds or compositions which decompose at a specific temperature to yield a large volume of gas. Sodium bicarbonate, the most widely used inorganic CBA, has limited use because it decomposes only in the presence of an acid.

Organic CBAs tend to evolve gas over a more defined temperature range. *Modern Plastics Encyclopedia*, 1979-1980, pp. 186-188, teaches a group of known organic CBAs useful in the production of foamed, cross-linked polyethylene. The blowing composition of U.S. Pat. No. 3,658,730 utilizes azodicarbonamide, a known organic blowing agent, in conjunction with a chromium compound. The use of azobisformamide and many other blowing agents is taught in U.S. Pat. No. 3,470,119. The disadvantage of using such azo blowing agents is the production of small amounts of ammonia, which can corrode equipment.

The production of cross-linked polyethylene foams generally requires the use of cross-linking agents in addition to the blowing agent. An exception to the requirement of separate cross-linking and blowing agents is disclosed in U.S. Pat. No. 4,129,531 and U.S. Pat. No. 4,101,464, wherein certain azo esters function as cross-linking/blowing agents. However, as with other azo blowing compounds, small amounts of ammonia are produced. A second exception to the requirement of separate cross-linking and blowing agents is disclosed in U.S. Pat. No. 4,276,247, wherein cyclic peroxyketals are used as combined cross-linking/blowing agents in the production of foamed polyethylene.

Many organic peroxides, including di(alkylperoxy) acetylenes, are known to be effective cross-linking agents for thermoplastic resins. U.S. Pat. No. 3,214,422 teaches di(t-butylperoxy)-hexynes and -octynes as cross-linking agents for polyethylene; this patent does not disclose any possible use of these compounds as blowing agents.

DESCRIPTION OF THE INVENTION

This invention relates to the novel use of certain di(alkylperoxy)acetylenes as blowing agents to make foamed, cross-linked polyethylene, and to novel expansible mixtures of polyethylene blended with both di(alkylperoxy)acetylene cross-linking/blowing agents and certain antioxidants which operate as activators.

It has now been discovered that certain dialkylperoxyacetylenes heretofore thought to be useful only as cross-linking agents can be utilized as blowing agents as well. The use of these di(alkylperoxy)acetylene cross-linking/blowing agents in the compositions and processes of the present invention results in cross-linked polyethylene foam with good color and improved heat stability without the formation of corrosive by-products The cross-linking/blowing agents according to the present invention exhibit markedly superior foaming or blowing properties over known non-azo-containing cross-linking/blowing agents, such as cyclic peroxyketals; at the same time, the cross-linking/blowing agents of the present invention have cross-linking abilities which are generally comparable to those of known cross-linking agents.

In particular, the present invention relates to the use of di(t-amylperoxy)acetylenes which provide the dual function of cross-linking and blowing agents. The cross-linking/blowing agents of the present invention are organic peroxides of the formula:

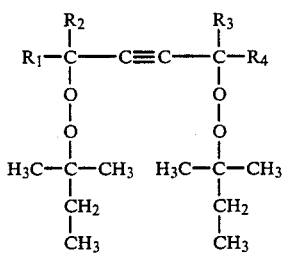

wherein each of $R_1$, $R_2$, $R_3$, and $R_4$ is selected from branched or straight-chain alkyl having 1-4 carbon atoms, e.g., methyl, ethyl, propyl, isopropyl, n-butyl, s-butyl, t-butyl.

The di(t-amylperoxy)acetylenes of the present invention decompose at temperature ranges at which polyethylene is conveniently molded, typically in the range of 150°-250° C., to yield gaseous products and decomposition residues which are compatible with foamed, cross-linked polyethylene. The gas yield upon decomposition is sufficient to create a foam when the di(t-amylperoxy)acetylenes are used as blowing agents according to the present invention. The amount of gas evolution is generally determined by the temperature and time.

Generally, the extent of cross-linking and resulting foam density depend on several factors, including the temperature and other conditions under which the molding is carried out, the identity and proportion of the cross-linking/blowing agent used, the type of polyethylene used, and the type and amounts of additives, such as antioxidants and activators incorporated in expansible polyethylene mixtures. These factors are interdependent and may limit the available range of characteristics of the finished product. For example, depending on the particular molding process, molding temperature, additives, and type of polyethylene used, a single cross-linking/blowing agent may not be capable of readily producing the desired degree of cross-linking in a finished product having the desired foam density.

To increase the flexibility of molding processes utilizing di(t-amylperoxy)acetylenic cross-linking/blowing agent of the present invention, it may be desirable to incorporate a second cross-linking/blowing agent in the expansible polyethylene/di(t-amylperoxy) acetylene compositions of the present invention. In particular, it has been found that certain known cross-linking/blowing agents, such as those described in U.S. Pat. No. 4,276,247, and certain known cross-linking agents, such as those described in U.S. Pat. No. 3,214,422, can be used in conjunction with the di(t-amylperoxy)acetylenic cross-linking blowing agents of the present invention to vary the degree of cross-linking and foam density as desired in finished polyethylene foam products.

To avoid a change of properties upon extended exposure to heat, antioxidants may be incorporated into the polyethylene composition prior to molding, thereby stabilizing the molded polyethylene articles during and after the molding process. In general, for normal temperature operation, many stabilizing antioxidants can be used. However, many antioxidants have a negative effect upon low temperature impact strength, and it is known that good low temperature impact strength can be obtained by using, as antioxidants, the esters of thiodipropionic acids described in U.S. Pat. No. 3,876,613. However, in addition to acting in their known capacities of antioxidants, when utilized according to the present invention, such esters of thiodipropionic acid serve a second function as activators for the organic peroxide cross-linking/blowing agents in that they affect the rate and extent of decomposition of such organic peroxides.

Novel expansible compositions from which foamed, cross-linked polyethylene is prepared comprise polyethylene, a di(t-amylperoxy)acetylene as described above, and an antioxidant/activator which is an ester of thiodipropionic acid.

The process of the present invention comprises the steps of providing an expansible mixture comprising polyethylene and an effective amount, typically 0.10–10% by weight of the polyethylene, of an organic peroxide cross-linking/blowing agent; heating said mixture by conventional means to cross-link said polyethylene, and expanding the mixture to a volume greater than the initial volume of the mixture whereby the density of the polyethylene is reduced, typically by 55–60% or more.

In one embodiment, the mixture also includes an effective amount, typically 0 to 3 times the amount of di(t-amylperoxy)acetylenic cross-linking/blowing agent, of a secondary cross-linking/blowing agent. One class of compounds useful as secondary cross-linking/blowing agents in the composition and processes of the present invention are cyclic peroxyketals having the formula:

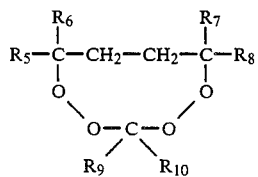

wherein each of $R_5$, $R_6$, $R_7$, and $R_8$ is selected from branched and straight-chain alkyl having from 1–4 carbon atoms and each of $R_9$ and $R_{10}$ is selected from alkyl, hydroxyalkyl, and alkylcarboxylate ester groups having up to about 10 carbon atoms,

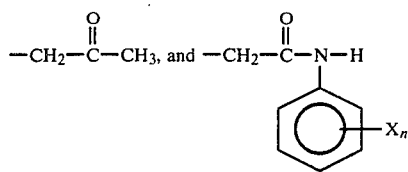

where $n=0-3$ and X is lower alkyl or alkoxy of up to about 5 carbon atoms.

Another group of compounds useful as secondary cross-linking/blowing agents in the compositions and processes of the present invention are di(t-butylperoxy)acetylenes having the formula:

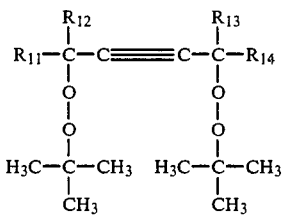

wherein $R_{11}$, $R_{12}$, $R_{13}$, and $R_{14}$ are selected from the group consisting of branched- and straight-chain alkyl having from about 1–4 carbon atoms.

In another embodiment, the mixture also includes an effective amount, typically 0.02 to 0.50 weight percent of an ester of thiodipropionic acid which acts as both an antioxidant for the foamed, cross-linked polyethylene and as a promoter or activator of the organic peroxide. More often, the amount is in the range of 0.05–0.10 weight percent, which range includes amounts which have been found to give good results.

The antioxidants/activators useful in the composition and processes of the present invention are esters of thiodipropionic acid having the formula:

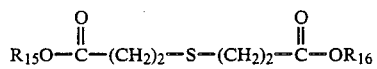

wherein $R_{15}$ and $R_{16}$ are selected from the group consisting of alkyl, alkenyl, aryl, and cycloalkyl hydrocarbon radicals and combinations thereof such as alkaryl, aralkyl and alkylcycloalkyl, having up to 22 carbon atoms and wherein at least one of $R_{15}$ and $R_{16}$ has at least 10 carbon atoms per molecule.

A presently preferred group of esters of thiodipropionic acid in which each of $R_{15}$ and $R_{16}$ has 12–20 carbon atoms, more preferably esters in which both $R_{15}$ and $R_{16}$ are the same, include the dilauryl, distearyl, dimyristyl, dioleyl and diricinoleyl esters.

Polyethylene foam products having high impact strength at low temperature can also be obtained when a phenolic antioxidant is incorporated into the polymer in addition to the ester of thiodipropionic acid of the present invention. Amounts of the phenolic antioxidant, such as Irganox 1010, up to about 0.5% by weight, preferably up to about 0.1% by weight, can be utilized with good results.

In accordance with the present invention, the di(t-amylperoxy)acetylene cross-linking/blowing agents described are blended with polyethylene. The polyethylene useful in the novel compositions and processes of the present invention may be low, medium, or high density polyethylene as described in *Modern Plastics Encyclopedia* (1978–1979). "High density polyethylene" (HDPE) means substantially linear polyethylene, i.e., having few side chains and a density of greater than about 0.95 g/cc. "Medium density polyethylene" (MDPE) means polyethylene with short side chains and a density of from about 0.940 to about 0.955 g/cc. "Low density polyethylene" (LDPE) means branched-chain polyethylene having a density of from about 0.910 to about 0.935 g/cc.

As will be known and understood by those in the art, the polyethylene useful in the present invention may contain varying quantities of other comonomers, such as 1-butene, 1-hexene, and propylene.

Incorporation of the cross-linking/blowing agents may be effected by a variety of techniques known in the art, including dry tumbling, liquid dispersion of the organic peroxides, and pelletized concentrates of the organic peroxides. Each of these techniques is described in more detail in *Modern Plastics Encyclopedia* (1979–1980), p. 188.

Once the mixing of the polyethylene and the cross-linking/blowing agent is completed, the mixture is molded by conventional means under conditions which allow expansion of the foam, including heating to a temperature sufficient to cross-link and foam the polyethylene, usually within a preferred range of 150°–250° C. Typically, the mixture is heated to a temperature sufficient to effect cross-linking and foaming in the absence of applied pressure or substantially at atmospheric pressure in a mold having a volume greater than the initial volume of the mixture and the mixture expands to fill the mold volume. The cross-linking and foaming may occur simultaneously or sequentially. The resultant foamed or expanded polyethylene, having increased in volume, will typically have a reduction in density of at least 55–60% as compared to the starting density of the polyethylene. Where a foamed article of a particular shape is desired, the step of mixing the polyethylene and the cross-linking/blowing agent may be followed by shaping the mixture into the desired form.

The expansible mixtures of the present invention may be foamed by a variety of conventional methods. For example, foamed polyethylene blocks, or articles may be prepared by introducing a volume of mixture into a mold having a larger total volume and heating the mixture within the mold to at least 150° C. whereby the polyethylene is cross-linked and expands into and fills the mold. The foamed polyethylene blocks may then be set by cooling. In another embodiment, the expansible mixture may be introduced into a mold of substantially the same volume. The mixture in the mold is then heated to at least 150° C. to initiate cross-linking and foaming. As the pressure within the mold increases, the volume of the mold may be increased, as by separating the sides, thereby allowing the foam to gradually expand with the mold. Alternatively, the expansible mixture may be heated in a mold of substantially the same volume to at least 150° C. for a period of time sufficient to initiate cross-linking, followed by a release of pressure, thereby allowing the polyethylene to expand. The heating may be carried out under an initially applied pressure or the pressure may increase from initially atmospheric pressure conditions due to the gaseous products released during the decomposition of the cross-linking/blowing agent. In another embodiment, sheet-like polyethylene may be turned into foamed sheet by continuously heating it on a wire-net conveyor in a hot-air oven.

The amount of pure cross-linking/blowing agent may vary, depending on the density of the starting polyethylene, the temperature, and the degree of foaming, i.e., expansion, desired, but will usually be in the range of from about 0.010–10%, though more typically 0.50–5.0% by weight of the polyethylene. Similarly, as will be known and understood by those skilled in the art, the process steps followed in the practice of the present invention can be varied, depending on the type of polyethylene utilized, the density of foam desired, and the degree of cross-linking desired.

In a preferred embodiment, the heating, for purposes of simultaneously or sequentially foaming and cross-linking the polyethylene, is applied during the procedure known as "rotational molding." Rotational molding is a process intended primarily for the manufacture of hollow objects. In this process, the solid or liquid polymer is placed in a mold; the mold is first heated and then cooled while being rotated about two perpendicular axes simultaneously. During the first portion of the heating stage, when molding powdered material, a porous skin is formed on the mold surface. This gradually melts as the cycle progresses to form a homogenous layer of uniform thickness. However, when molding a liquid material, it tends to flow and coat the mold surface until the gel temperature of the resin is reached, at which time all flow ceases. The mold is then indexed into a cooling station, where forced air, water spray, or a combination of both, cools the mold. It is then positioned in a work zone, where the mold is opened, the finished part removed, and the mold recharged for the following cycle. Centrifugal force, rather than applied pressure, is utilized during rotational molding. For more details as to various techniques and apparatus used in rotational molding, see Kravity and Heck, "Now's The Time To Look Into Foam Rotational Molding," *Plastics Technology,* October 1979, pp. 63–66.

The following experimental work is designed to show the satisfactory results obtained by the processes and compositions of the present invention.

EXPERIMENTAL PROCEDURES

The resin mixture was prepared by dry-blending the peroxide and other additives together into 30 g of MDPE powder (55 mesh) for about five minutes. The resin used was Phillips Marlex TR880 with a density of 0.955 and a melt index of 18. Platen temperatures on the press were checked with a surface pyrometer and were either 200° C. or 240° C. Molding time was 15 minutes.

The resin mixture was spread evenly over the lower platen, which had been covered with aluminum foil. Another sheet of aluminum foil was placed on top of the resin mixture. The platens were then gently brought together (about 4 mm apart) with very little, if any, ram pressure applied. At the end of the molding cycle, the ram pressure indicated on the press gauge was approximately 1,000 lbs. The molded specimen was then released and cooled quickly in water. Each molded specimen had the aluminum foil peeled off before any evaluations were performed.

To determine the % weight gel, approximately 0.3000g sample was cut into 6–7 pieces and placed inside a stainless steel screen pouch. These pouches were extracted in 2 liters of boiling xylene containing 10g of Plastanox 2246 antioxidant for 16 hours, and then dried in an oven at 170° C. for 4 hours.

The % wt. gel was calculated by the following formula:

$$\% \text{ wt. gel} = \frac{W_1 - (W_2 - W_3)}{W_1} - 0.0036 \times 100$$

where:
$W_1$ = wt. of sample, g
$W_2$ = wt. of sample + pouch, g
$W_3$ = wt. of sample + pouch after extraction, g
0.0036 = blank value for resin without peroxide.

Densities were determined by ASTM 1622-63, "Apparent Density of Rigid Cellular Plastics." The procedure is to cut out rectangles of the cross-linked foamed specimens and measure as accurately as possible their length, width, and thickness with a dial caliper. The volume can then be calculated. The density was found by dividing the weight of each rectangle by its volume.

Heat stability tests were done by cutting out 1 cm × 2 cm rectangles of the cross-linked foamed specimens and placing them in an oven at 140° C. and observing the color change with time.

The di(t-amylperoxy)acetylenes of the present invention can be prepared by reacting the designated dihydroxyacetylene with t-amylhydroperoxide according to the following experimental procedure used for the preparation of 2,5-dimethyl-2,5-di(t-amylperoxy)hexyne-3 (AH-3).

EXAMPLE 1

Preparation and Purification of
2,5-dimethyl-2,5-di(t-amylperoxy)hexyne-3

A solution was prepared by dissolving 85.32 g (0.6 mol) of 2,5-dimethyl-2,5-dihydroxyhexyne-3 in an excess of 284 g. of 83.6% purity tert-amyl hydroperoxide (2.28 mol) at about 30° C. The solution was cooled to about 5° C., and 150.8 g of 78% sulfuric acid (1.7 mols) was slowly added. The temperature was maintained at or below 10° C. during the acid addition. Some discoloration of the reaction solution occurred.

The solution was stirred at 5° C. for 1.5 hrs. following completion of the acid addition; the solution was then poured into ice water. The product layer was extracted twice with petroleum ether and the combined organic layers were washed once with water, three times with 5% potassium hydroxide, and finally three times with water. The petroleum ether solution containing the desired product was dried with sodium sulfate and then evaporated. A yield of 87.7 g (theory 188.6 g) was obtained, 46.5% based on the starting dihydroperoxyhexyne.

The product was analyzed by HPLC chromatography using an Alltech Absorbosphere C18 5μ column, a solvent comprising 90% acetonitrile and 10% water, a flow rate of 1.5 ml/min., and a refractive index detector. The following results were obtained:

| Elution Time, Min. | Area % of Component |
|---|---|
| 1.88 | 28.67 (unreacted t-amylhydroperoxide) |
| 2.27 | 2.23 (Unknown) |
| 2.53 | 7.35 (mono-t-amylperoxy intermediate) |
| 3.15 | 1.39 (Unknown) |
| 4.05 | 4.74 (Unknown) |
| 5.17 | 55.61 (AH-3) |

The product mixture was then washed four times with 75% methanol/25% water to remove the unreacted t-amylhydroperoxide. Finally, the product was vacuum-stripped at 65° C. and 1 mm pressure to remove a small amount of di-t-amyl peroxide which was formed as a byproduct during synthesis.

The volatile components of the product mixture separated by the vacuum stripping and the nonvolatile portion were separately analyzed with HPLC chromatography using a 75% acetonitrile/25% water solvent; 1.0 ml/min. flow rate; an Alltech Absorbosphere C18 5μ column; and a refractive index detector. The following results were obtained on the volatile components removed from the product mixture:

| Elution Time, Min. | Area % of Component |
|---|---|
| 5.80 | 2.24 (Unknown) |
| 6.45 | 2.41 (Unknown) |
| 15.92 | 2.82 (Unknown) |
| 22.30 | 16.68 (di-t-amyl peroxide) |
| 23.26 | 70.74 (AH-3) |
| Misc. small peaks | 5.11 (Unknown) |

The results from the HPLC analysis of the nonvolatile portion of the product mixture are as follows:

| Elution Time, Min. | Area % of Component |
|---|---|
| 5.78 | 6.77 (mono-t-amylperoxy intermediate) |
| 15.00 | 1.83 (Unknown) |
| 16.05 | 1.28 (Unknown) |
| 22.59 | 86.22 (AH-3) |
| Misc. small peaks | 3.90 (Unknown) |

The nonvolatile fraction of the product mixture was used for the foaming/cross-linking processes without further purification.

For the purposes of testing and demonstrating the efficacy of the di(t-amylperoxy)acetylenes of the present invention as cross-linking/blowing agents, the peroxides listed in Table I were tested. 2,5-dimethyl-2,5-di-(t-butylperoxy)hexyne-3, hereinafter referred to as "BH-3," is included for comparison because it is the preferred commercial peroxide used for preparing cross-linked MDPE and HDPE; 3,6,6,9,9-pentamethyl-3-ethylacetate-1,2,4,5-tetraoxacyclononane (hereinafter "CP-A") is included in Table I and in the test results to be described below as an example of the cyclic peroxyketals previously used as cross-linking/blowing agents with MDPE and HDPE.

Table II shows the results of comparative tests utilizing BH-3 and AH-3. The results indicate that, unlike BH-3, as the amount of AH-3 is increased at a given mold temperature, the degree of cross-linking increases considerably while the foam density decreases. Similarly, as the mold temperature is increased, the degree of cross-linking obtained using AH-3 decreases somewhat for a given quantity of AH-3 while the foam density is essentially unchanged. For comparable quantities of the two different peroxides at the same mold temperature, while AH-3 exhibits a slightly decreased degree of cross-linking, the foam density is greatly decreased, indicating substantially higher efficacy of AH-3 as a blowing agent. AH-3 exhibits considerably greater variation in the degree of cross-linking and foam density with mold temperature and relative amount of cross-linking/blowing agent than does BH-3 and hence is considerably more versatile in controlling the final properties of the MDPE and other foams produced according to the present invention.

TABLE I

Peroxides Used to Make Cross-linked MDPE Foams

| Peroxide | Abbreviation |
|---|---|
| 1. 2,5-Dimethyl-2,5-Di-(t-Butyl Peroxy) Hexyne-3 | BH-3 |
| 2. 2,5-Dimethyl-2,5-Di-(t-Amyl Peroxy) Hexyne-3 | AH-3 |
| 3. 3,6,6,9,9-Pentamethyl-3-Ethyl Acetate-1,2,4,5-Tetraoxacyclononane | CP-A |

TABLE II

Densities and Percent Gels of Cross-linked MDPE Foams Made With BH-3 and AH-3 15 Minutes Molding Time

| Peroxide | phr Peroxide | Mold Temp. C. | % Wt. Gel | Foam Density g/cm³ | Foam Density lb/ft³ |
|---|---|---|---|---|---|
| 1. BH-3 | (a) 0.5 | 200 | 96.6 | 0.83 | 51.8 |
|  | (b) 0.75 | 200 | 100.0 | 0.84 | 52.4 |
|  | (c) 1.0 | 200 | 93.2 | 0.79 | 49.3 |
| 2. AH-3 | (a) 0.5 | 200 | 2.2 | 0.60 | 37.5 |
|  | (b) 0.75 | 200 | 54.7 | 0.50 | 31.2 |
|  | (c) 1.0[1] | 200 | 81.4 | 0.43 | 26.8 |
|  | (d) 0.5 | 240 | 2.3 | 0.61 | 38.1 |
|  | (e) 0.75 | 240 | 42.2 | 0.53 | 33.1 |
|  | (f) 1.0 | 240 | 52.4 | 0.42 | 26.2 |

[1]Average values from 4 tests

TABLE III

Densities and Percent Gels of Cross-linked MDPE Foams Made With Co-Peroxide Blends Containing AH-3 200° C. and 15 Minutes Molding Time

| Peroxides | phr Peroxides | phr Irganox 1010 | phr DSTDP | % Wt. Gel | Foam Density g/cm³ | Foam Density lb/ft³ |
|---|---|---|---|---|---|---|
| 1. AH-3/CP-A | (a) 0.25/0.75 | — | — | 93.0 | 0.58 | 36.2 |
|  | (b) 0.50/0.50 | — | — | 92.5 | 0.52 | 32.5 |
|  | (c) 0.75/0.25[1] | — | — | 90.7 | 0.455 | 28.4 |
|  | (d) 0.75/0.25 | 0.1 | — | 86.2 | 0.50 | 31.2 |
|  | (e) 0.75/0.25 | — | 0.1 | 17.9 | 0.47 | 29.3 |
| 2. AH-3/BH-3 | (a) 0.90/0.10 | — | — | 90.2 | 0.48 | 30.0 |
|  | (b) 0.85/0.15 | — | — | 89.8 | 0.50 | 31.2 |
|  | (c) 0.75/0.25 | — | — | 94.0 | 0.54 | 33.7 |

[1]Average values from 2 tests

TABLE IV

Densities and Percent Gels of Cross-linked MDPE Foams Made With CP-A and AH-3 200° C. and 15 Minutes Molding Time

| Peroxide | phr Peroxide | phr Irganox 1010[1] | phr DSTDP[2] | phr ZnO[3] | phr ABFA[4] | % Wt. Gel | Foam Density g/cm³ | Foam Density lb/ft³ |
|---|---|---|---|---|---|---|---|---|
| 1. CP-A | (a) 1.0 | — | 0.1 | — | — | 52.2 | 0.50 | 31.2 |
|  | (b) 1.5 | — | 0.1 | — | — | 87.0 | 0.46 | 28.7 |
|  | (c) 1.5 | — | — | 1.0 | — | 92.1 | 0.51 | 31.8 |
| 2. AH-3 | (a) 1.0 | — | — | — | — | 81.4 | 0.43 | 26.8 |
|  | (b) 1.0 | — | 0.1 | — | — | 70.6 | 0.39 | 24.3 |
|  | (c) 1.0 | — | — | 1.0 | — | 77.3 | 0.42 | 26.2 |
|  | (d) 1.0 | — | 0.1 | 1.0 | — | 71.9 | 0.43 | 26.8 |
|  | (e) 1.0 | — | — | — | 1.0 | 46.6 | 0.42 | 26.2 |
|  | (f) 1.0 | — | 0.1 | — | 1.0 | 43.6 | 0.46 | 28.7 |
|  | (g) 1.0 | — | — | 1.0 | 1.0 | 57.5 | 0.34 | 21.2 |
|  | (h) 1.0 | — | 0.1 | 1.0 | 1.0 | 65.4 | 0.33 | 20.6 |
|  | (i) 1.0 | 0.1 | — | — | — | 72.3 | 0.48 | 30.0 |
|  | (j) 1.0 | 0.1 | — | 1.0 | — | 69.8 | 0.44 | 27.5 |

[1]A phenolic antioxidant
[2]A thioester antioxidant
[3]Zinc oxide
[4]Azobisformamide

TABLE V

Heat Stability Tests at 140° C. on Selected Cross-linked MDPE Foams 200° C. and 15 Minutes Molding Time

| Cure System | Days at 140° C. 1 | 2 | 4 | 9 | 14 |
|---|---|---|---|---|---|
| 1. 1.0 phr AH-3 | Y | BY | BY | BY | BR |
| 2. 1.0 phr AH-3, 0.1 phr DSTDP | Y | BY | BY | BY | BR |
| 3. 1.0 phr AH-3, 0.1 phr DSTDP, 1.0 phr ZnO | Y | BY | DBR | DBR | BL |
| 4. 1.0 phr AH-3, 0.1 phr I 1010[1] | Y | BY | BY | BY | BR |
| 5. 1.0 phr AH-3, 0.1 phr I 1010[1] 1.0 phr ZnO | BR | DBR | DBR | DBR | BL |

TABLE V-continued

Heat Stability Tests at 140° C. on
Selected Cross-linked MDPE Foams
200° C. and 15 Minutes Molding Time

| Cure System | Days at 140° C. | | | | |
|---|---|---|---|---|---|
| | 1 | 2 | 4 | 9 | 14 |
| 6. 0.75 phr AH-3, 0.25 phr CP-A | LY | Y | Y | BY | BR |
| 7. 0.75 phr AH-3, 0.25 phr CP-A, 0.1 phr I 1010[1] | LY | Y | BY | BY | BR |
| 8. 0.75 phr AH-3, 0.25 phr CP-A, 0.1 phr DSTDP | W | Y | Y | BY | BR |

Color Legend:
W = White
LY = Light Yellow
Y = Yellow
BY = Brownish Yellow
BR = Brown
DBR = Dark Brown
BL = Black
[1]Irganox 1010

Table III presents the results of using combinations of cross-linking/blowing agents with MDPE. With both sets, i.e., AH-3 with CP-A and with BH-3, as the amount of AH-3 increases, the density of the cross-linked foam decreases. When AH-3 and CP-A are used as combined cross-linking/blowing agents with MDPE, the foam density decreases significantly as the proportion of AH-3 is decreased while the degree of cross-linking (% Wt. Gel) decreases only slightly. Similar behavior is observed when AH-3 is combined with BH-3 except that the resultant foam density and degree of cross-linking are somewhat higher for comparable ratios of AH-3 to secondary cross-linking/blowing agent. These results demonstrate the wide range of properties of foams producible using the peroxides according to the present invention, alone or in combination with known cross-linking/blowing agents.

Table IV shows comparisons of AH-3 with CP-A, along with the use of various additives with CP-A and AH-3. From the results tabulated in Table IV, AH-3 is shown to be a better cross-linking/blowing agent than CP-A when the same relative amount of peroxide is used. Table IV includes the results of tests of AH-3 with two different antioxidants, Irganox 1010 and DSTDP. Irganox 1010 is a phenolic-type antioxidant. Both antioxidants reduce the degree of cross-linking, with the decrease more pronounced when using DSTDP. DSTDP decreases the foam density slightly, while Irganox 1010 increases the foam density slightly. The data in Table III indicate the characteristics of foam blown and cross-linked with a combination of AH-3 and CP-A change slightly with the incorporation of a phenolic antioxidant (Irganox 1010), but are altered substantially with the addition of DSTDP. The antioxidant chosen when it is desirable to have an antioxidant present in the finished cross-linked/blown foam will depend upon the desired characteristics of the finished product.

When zinc oxide (ZnO) is included in the starting mixture, zinc oxide alone has relatively little effect upon the degree of cross-linking and blowing available with AH-3. When used in combination with antioxidants, ZnO partially nullifies the effect of DSTDP on the loss of percent gel (degree of cross-linking) without affecting the density of the foam. ZnO does not nullify the effect of Irganox 1010 on the decreased degree of cross-linking, but does offset the slight loss in blowing characteristic.

The results in Table IV also indicate (examples e-h) that the incorporation of azobisformamide (ABFA) in the starting mixture has a pronounced deleterious effect on the degree of cross-linking available without, generally, any improvement in the degree of foaming. When ZnO is used in combination with ABFA and AH-3, the degree of cross-linking is improved over the AH-3/ABFA combination (while still less than AH-3 alone or with ZnO), but causes a significant decrease in foam density. In Table V, heat stabilities of cross-linked polyethylene foams made with either AH-3 alone or in combination with examples of the preferred antioxidants and with zinc oxide are shown. The use of antioxidants with AH-3 does not appear to improve the heat stability of the molded products. However, the incorporation of ZnO hastens thermal decomposition. It appears that the presence of CP-A as a secondary cross-linking/blowing agent is beneficial to the heat stability of the molded specimen. CP-A as a secondary cross-linking/blowing agent is exemplary of the behavior of cyclic peroxyketals disclosed in U.S. Pat. No. 4,276,247, the disclosure of which is incorporated herein by reference.

What is claimed is:

1. A method for making foamed, cross-linked polyethylene comprising:

mixing polyethylene with about 0.1–10% by weight of a cross-linking/blowing agent of the formula

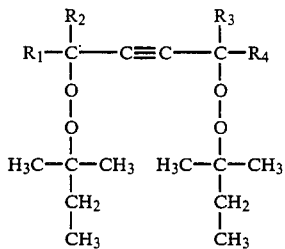

wherein each of $R_1$, $R_2$, $R_3$, and $R_4$ is selected from straight and branched alkyl having from 1–4 carbon atoms; and heating said mixture to a temperature sufficient to cross-link and foam said polyethylene under conditions which permit expansion of the polyethylene.

2. A method according to claim 1 wherein said step of mixing further comprises mixing an antioxidant of the formula

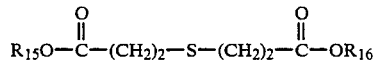

wherein $R_{15}$ and $R_{16}$ are selected from the group consisting of alkyl, alkenyl, aryl, cycloalkyl, hydrocarbon radicals, and combinations thereof, and wherein at least one of $R_{15}$ and $R_{16}$ has at least 10 carbon atoms.

3. A method according to claim 2 wherein $R_1$, $R_2$, $R_3$, and $R_4$ are each methyl, and $R_{15}$ and $R_{16}$ are each alkyl of from 10–25 carbon atoms and said step of heating is at a temperature of at least about 150° C.

4. A method according to claim 1 wherein said mixture is simultaneously cross-linked and foamed.

5. A method according to claim 1 wherein said heating is under pressure and further comprising the step of releasing said pressure whereby said foam is allowed to expand.

6. A method according to claim 1 wherein said step of mixing further comprising mixing a nucleating agent of the formula ZnO.

7. A method according to claim 1 wherein said step of mixing further comprises mixing a second cross-linking/blowing agent of the formula:

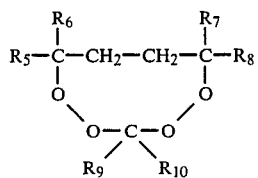

wherein each of $R_5$, $R_6$, $R_7$, and $R_9$ is selected from alkyl having from 1–4 carbon atoms and each of $R_9$ and $R_{10}$ is selected from alkyl, hydroxyalkyl, and alkylcarboxylate ester groups having up to about 10 carbon atoms,

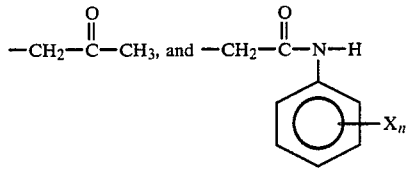

where n=0–3 and X is lower alkyl or alkoxy of up to about 5 carbon atoms; such that said mixture comprises said second blowing agent in an amount equal to from about 0 to about 3 times the amount of said cross-linking/blowing agent.

8. A method according to claim 1 wherein said step of mixing further comprises mixing a second cross-linking/blowing agent of the formula:

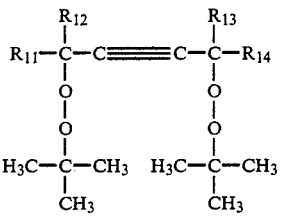

wherein each of $R_{11}$, $R_{12}$, $R_{13}$, and $R_{14}$ is selected from branched- and straight-chain alkyl having from 1–4 carbon atoms, said second cross-linking/blowing agent being mixed in an amount up to about amount of said cross-linking/blowing agent.

9. A method for producing foamed, cross-linked polyethylene articles comprising the steps of
mixing polyethylene with about 0.1–10% by weight of an organic peroxide of the formula:

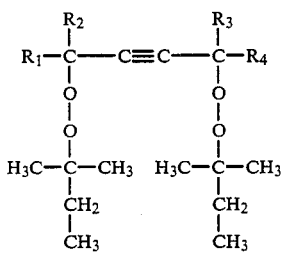

wherein each of $R_1$, $R_2$, $R_3$, $R_4$ is selected from branched and straight chain alkyl having from 1–4 carbon atoms, shaping said mixture comprising said polyethylene and said peroxide in a mold; heating said mixture to a temperature sufficient to foam and cross-link said polyethylene; and expanding said mixture.

10. A method according to claim 9 wherein said mold has a volume greater than the volume of said mixture and said mixture expands into said mold volume.

11. A method according to claim 9 wherein said mixture substantially fills said mold; said heating is under pressure; and further comprising releasing said pressure whereby said mixture expands.

12. In a method for producing hollow, foamed polyethylene articles by rotationally molding a composition comprising polyethylene of a density greater than 0.925 g/cc blended with a blowing agent under conditions which permit expansion of said composition, the improvement comprising utilizing the said blowing agent and organic peroxide of the formula:

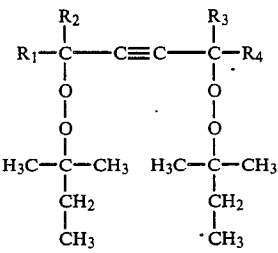

wherein each of $R_1$, $R_2$, $R_3$, and $R_4$ is selected from branched and straight chain alkyl having from 1–4 carbon atoms.

13. A composition of matter comprising a foamable, cross-linkable mixture of polyethylene with about 0.1–10% by weight of an organic peroxide of the formula:

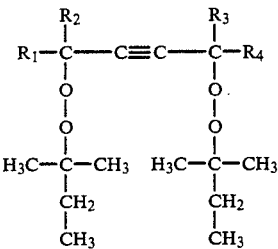

wherein each of $R_1$, $R_2$, $R_3$, $R_4$ is selected from branched and straight chain alkyl having from 1–4 carbon atoms.

14. The composition of matter of claim 13 wherein said mixture further comprises an antioxidant of the formula

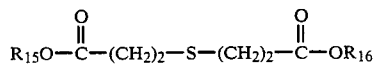

wherein $R_{15}$ and $R_{16}$ are selected from the group consisting of alkyl, alkenyl, aryl, cycloalkyl, hydrocarbon radicals, and combinations thereof, and wherein at least one of $R_{15}$ and $R_{16}$ has at least 10 carbon atoms.

15. The composition of matter according to claim 14 wherein $R_1$, $R_2$, $R_3$, and $R_4$ are each methyl, and $R_{15}$ and $R_{16}$ are each alkyl of from 10–25 carbon atoms.

16. The composition of matter according to claim 13 further comprising a nucleating agent of the formula ZnO.

17. The composition of matter of claim 13 wherein said mixture further comprises a second cross-linking blowing agent of the formula:

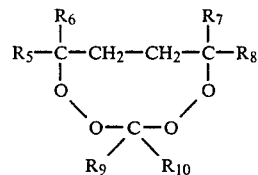

wherein each of $R_5$, $R_6$, $R_7$, and $R_8$ is selected from alkyl having from 1–4 carbon atoms and each of $R_9$ and $R_{10}$ is selected from alkyl, hydroxyalkyl, and alkylcarboxylate ester having up to about 10 carbon atoms,

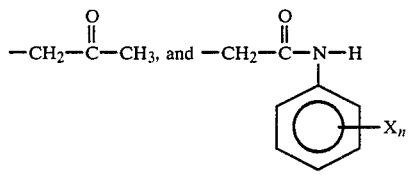

where n=0–3 and X is lower alkyl or alkoxy of up to about 5 carbon atoms; such that said mixture comprises said second cross-linking/blowing agent in an amount equal to from about 0 to about 3 times the amount of said organic peroxide.

18. The composition of claim 13 wherein said mixture further comprises a second cross-linking/blowing agent of the formula:

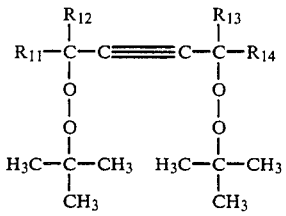

wherein $R_{11}$, $R_{12}$, $R_{13}$, and $R_{14}$ are each selected from branched- and straight-chain alkyl having from 1–4 carbon atoms, said second cross-linking/blowing agent being present in an amount up to about the amount of said organic peroxide.

19. The composition of matter of claim 14 wherein $R_1$, $R_2$, $R_3$, and $R_4$ are each methyl;
wherein $R_{15}$ and $R_{16}$ are each alkyl of from 10–25 carbon atoms; and
wherein said polyethylene has a density greater than 0.925 g/cc and is in granular form.

* * * * *